June 24, 1969   P. E. NAPOLITANO   3,451,417
COMBINATION OF RELIEF PRESSURE MECHANISM AND VALVE
Filed June 10, 1966   Sheet 1 of 2

INVENTOR
Pellegrino E. Napolitano
BY
Stevens, Davis, Miller & Mosher
ATTORNEYS

United States Patent Office 3,451,417
Patented June 24, 1969

3,451,417
COMBINATION OF RELIEF PRESSURE
MECHANISM AND VALVE
Pellegrino E. Napolitano, Brooklyn, N.Y., assignor to
Hudson Engineering Company, Hoboken, N.J., a
corporation of New Jersey
Filed June 10, 1966, Ser. No. 556,665
Int. Cl. G05d *16/10;* F16k *17/19*
U.S. Cl. 137—117                             4 Claims

ABSTRACT OF THE DISCLOSURE

A liquid system is disclosed including a pipe provide with a port. A cylindrical housing is mounted at one end to the exterior of the pipe about the port. A valve is arranged to close the port and is connected by a rod to a piston mounted in the housing. Ports are defined in the housing so that liquid escaping through the pipe port can escape through the housing ports. A web is arranged behind the piston to isolate the housing into two compartments. In the second compartment, a pressure relief piston is mounted and includes a projection that extends through a hole in the web and terminates in the first compartment spaced from the piston. Both pistons are spring biased, with the first piston biased to hold the valve open, and the second piston biased from the first piston. An arrangement is provided to sense the flow condition in the pipe and is used to actuate the first piston so that the valve is held closed so long as sufficient flow is occurring. A pressure relief arrangement is provided so that, upon excess pressures in the pipe, the second piston moves forward, and the projection strikes against the first piston unseating the valve.

---

Figure 1:
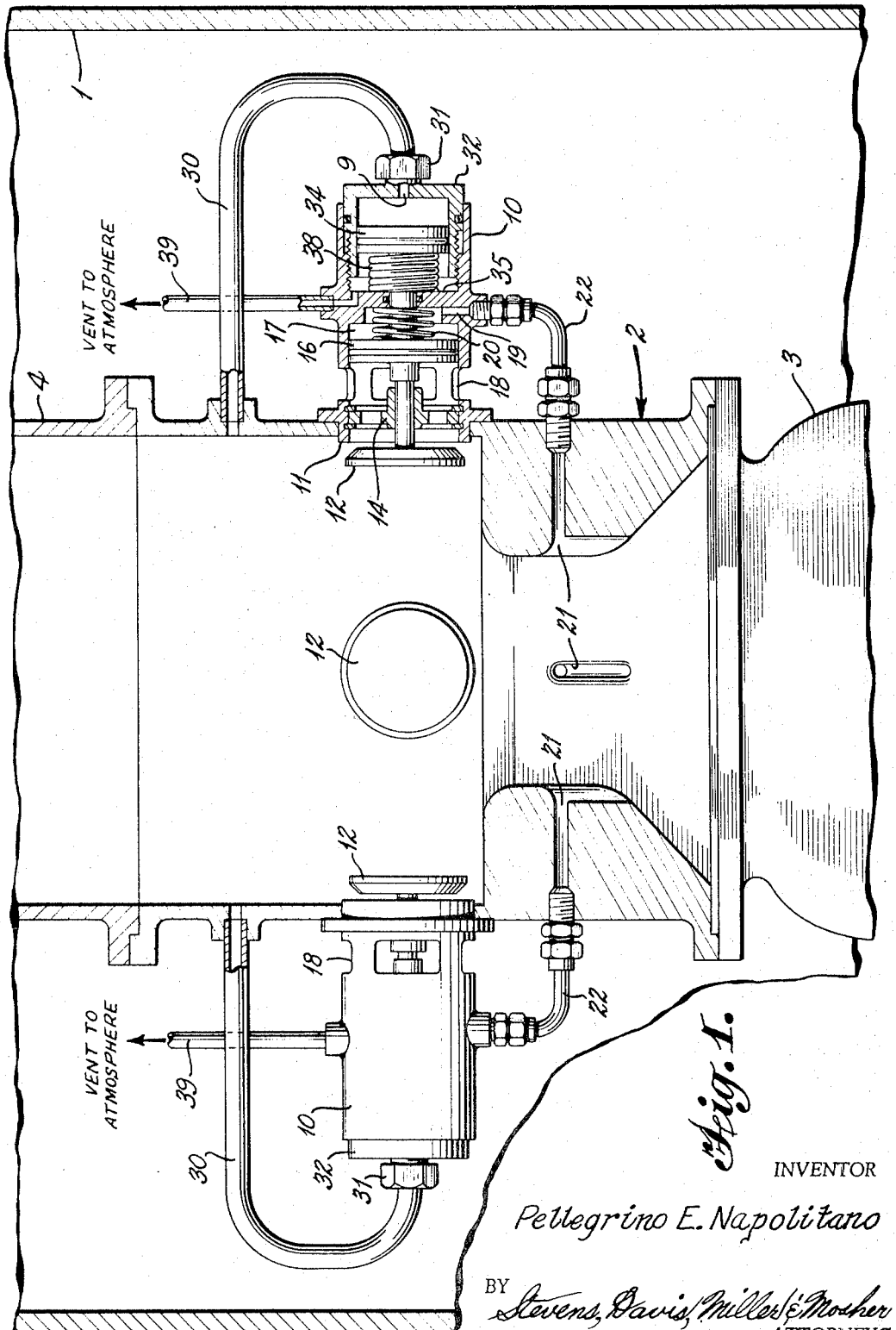

The present invention is an improvement of the invention disclosed in my copending application Ser. No. 418,707 now Patent No. 3,370,602 entitled "Self-Priming Liquid Pumping System and Primer Valve" filed Dec. 16, 1964, and relates to the combination of a relief mechanism and a valve and more specifically to an automatic self-priming pump system including a novel pressure relief mechanism.

In the application noted, an improved automatic self-priming pump system is described in which liquid is recycled from the discharge side to the inlet side of the pump whenever the supply of liquid to the pump inlet is interrupted. The repriming action restores the suction of the pump and again enables the pump to continue pumping liquid from the source of liquid supply. Pump systems of this type, however, are incapable of sensing and relieving an excess pressure in the discharge line which may occur for a variety of reasons.

The present invention solves this problem by providing as an integral part of the automatic self-priming mechanism, a novel pressure relief mechanism to immediately relieve excess pressure without interfering with the normal function of the self-priming portions of the system. The self-priming portion of the system consists basically of a valve movable to block and unblock an opening in the discharge column following the pump. The primer valve, mounted in some manner (such as shown in the copending application cited), includes a further mechanism operable to close the valve when liquid flows through the pump. The opening in the discharge column leads to a passageway eventually feeding to the inlet side of the pump. Thus, when the operating mechanism senses a lack of liquid flow, the valve moves to unblock the opening to allow the liquid pumpage at the discharge side of the pump to drain through the opening and reprime the pump. At all other times, i.e., when liquid is being pumped through the pump, the operating mechanism operates to cause the valve to block the opening. Thus, there is no provision in present day repriming systems for relieving excess pressure. The present invention includes apparatus that forms part of the primer valve structure, but remains functionally separated therefrom until an excess pressure in the system is sensed. When an excess liquid pressure in the system occurs, the relief pressure apparatus makes mechanical contact with the primer valve operating mechanism and overcomes its effect by forcing the valve to open.

Basically, the structure carrying out the present invention comprises a tube connecting the discharge pipe at a point upstream from the primer valve to a pressure chamber located at the rear portion of the primer valve. The primer valve is held closed by an operating mechanism attached to the valve and sensing liquid flow through the pump. Part of the pressure chamber in the relief system behind the primer valve includes a piston which is made to be spaced from the primer valve by a spring. Thus, so long as there is liquid flowing in the discharge column under normal pressure, the primer valve system and the relief system remian separate. In the event that the liquid pressure in the discharge line exceeds a preselected value or normal condition, the excess pressure causes the piston to overcome the effect of the operating mechanism attached to the valve by making mechanical contact with the primer valve forcing same to open. Upon opening, part of the pumpage drains or recycles itself to the pump inlet resulting in a drop in pressure at the discharge side of the pump. The resulting pressure is sensed in the pressure chamber, and the new resulting force of the piston against the spring will cause a corresponding movement of the primer valve poppet to give a greater or lesser opening as may be required to bypass the volume of liquid necessary to maintain the predetermined safe pressure. When the safe pressure is reached, the relief system disengages, and the operating mechanism again causes the primer valve to close.

Accordingly, the principal object of the present invention is to provide a relief mechanism for a primer valve used in self-priming liquid pumping systems.

The further object of the present invention is to provide a relief mechanism that forms an integral part of the self-priming mechanism, yet does not interfere with the normal function of the self-priming portion of the system.

A still further object of the present invention is to provide a pressure relief system that is highly responsive and provides instant relief to sudden pressure rises occurring in the system.

Another object of the present invention is to provide a liquid pressure relief mechanism wherein the point of pressure relief is adjustable.

A further object of the present invention is to provide a pressure relief mechanism that is positive and accurate in operation yet relatively uncomplicated and inexpensive to build.

Figure 2:
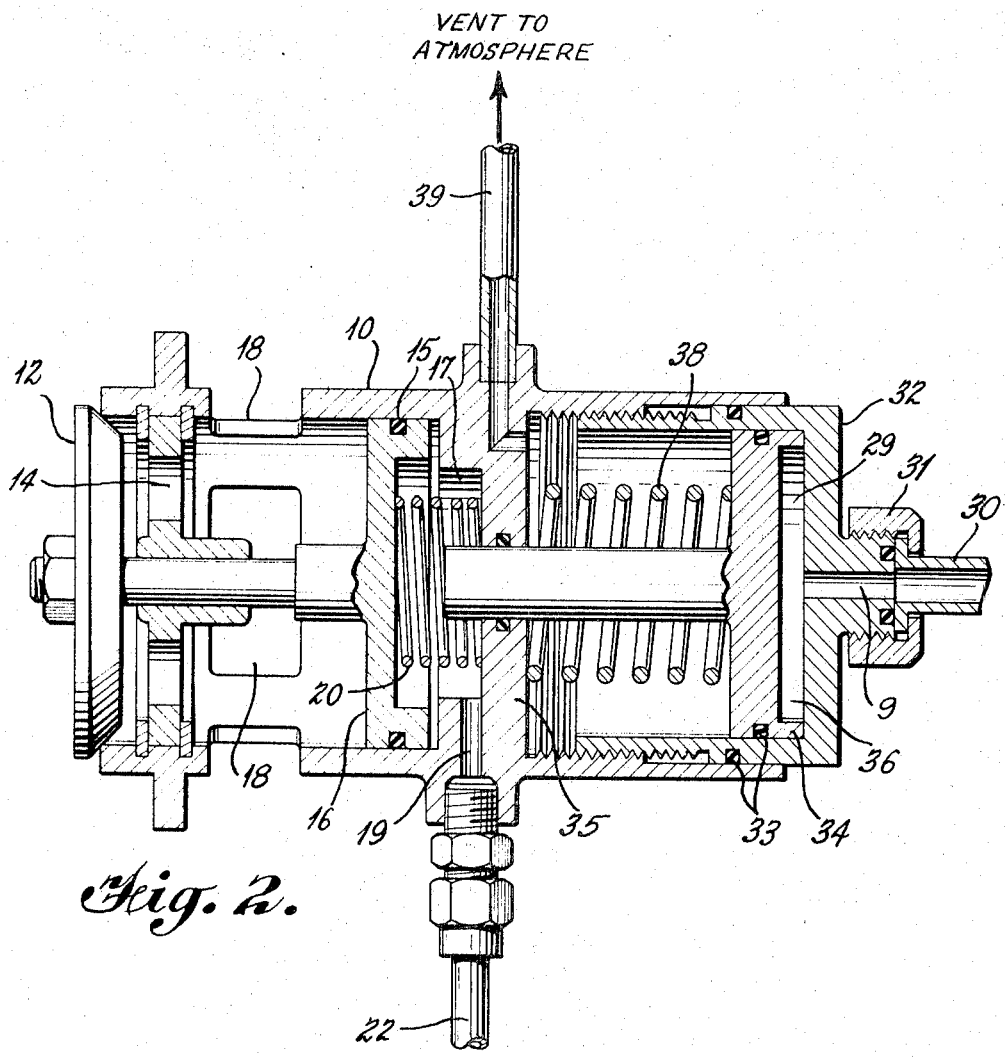

The above and still further objects, features and advantages of the present invention will become apparent upon consideration of the following detailed description of one specific embodiment thereof, especially when taken in conjunction with the accompanying drawings, wherein:

FIG. 1 is a side elevation partially in section of the system employing the invention, and, FIG. 2 is a vertical section view of the invention.

Referring to FIG. 1, an outer casing 1, surrounds pump 3, primer or recycling valve assembly 2, and discharge line 4. Primer valve assembly 2 is registered under the trademark "Primavac" by Hudson Engineering Company, and is the subject matter of my copending application identified above, and is located between the top portion 3 of the discharge side of the pump and the discharge line 4.

A plurality of poppet valves 12 are located periphally around the discharge line within housing 10 which has a valve seat 11 at its inner end. Although the poppet valve seat and housing are shown as an integral unit, a replaceable type seat may be employed in the well-known manner.

Housing 10 comprises an elongated barrel-shaped member having a valve seat 11 at one end and port 9 at the other end. A stationary housing web 35 formed as part of housing 10 dividies said housing. The forward area includes a guide 14 behind valve seat 11 which receives the stem of poppet valve 12. Piston 16 is connected to the outer end of the stem of poppet valve 12. Spring 20 presses against the back face of piston 16 and web 35 to normally open valve 12. Piston 16 is flanged and together with O-ring 15 cooperates with the forward side of web 35 to form a fluid-tight chamber 17 having a single entry port 19.

Line 22 is connected at one end to entry port 19 and at the other end to port 21 which communicates with the narrow portion of a venturi located in the pump discharge line. Openings 18 are cut in housing 10 behind guide 14 to allow drainage of the pumpage back to the pump inlet when valve 12 opens.

Referring to FIG. 2, cylinder 32 is threaded into the back side of housing 10 and defines with another flanged piston 34, a chamber 36, which is sealed by O-rings 33. The stem of piston 34 is guided by web 35 through a sealed opening at the center thereof. Spring 38 presses against the backside of piston 34 to hold the forward nose of said stem away from piston 16 so that there is a safety margin of clearance between said stem and piston 16 when poppet valve 12 is in the closed position. Cylinder 32 is threaded into housing 10 so that the compression of spring 38 can be adjusted.

A line 30 (FIG. 1) is connected from an upstream location on the discharge pipe to port 9 of cylinder 32 via a swivel connector 31. A vent 39 is placed behind piston 34 and communicates with the atmosphere. Web 35 together with its associated O-ring serves to separate the pressure relief section from chamber 17 as well as providing a guide for the stem of piston 34.

Having explained the structure of the valve in detail, the operation of the valve and pressure relief mechanism therefore will now be described. The operation of the primer or recycling valve is the subject of my copending application 418,707 now Patent No. 3,370,602 and therefore, will only briefly be described hereinbelow. Poppet valve 12 is normally held in the open position by spring 20. Upon actuation of the pump (not shown) liquid is pumped into the discharge line 4 through a venturi forming part of the valve structure 2. The venturi converts a pressure head to a velocity head at its narrow portion. The velocity head results in a low pressure effect which is communicated via ports 21 and tubing 22 to chamber 17. Under normal operating conditions, the reduced pressure in chamber 17 is sufficient to overcome the counteracting force of spring 20, thus holding poppet valve 12 closed.

Should, for any reason, the pump cease to pump the liquid, the decreased velocity of the liquid through the venturi results in the pressure against the face of poppet 12 and within chamber 17 becoming equal. This equalizing of pressure allows spring 20 to open poppet valve 12. Upon opening, pumpage within discharge line 4 drains back to the pump inlet via openings 18. Once sufficient liquid has drained within the casing well surrounding the inlet (not shown) of the pump, the pump again begins pumping the liquid, thus repeating the cycle. For a more detailed description of the operation, see the copending application identified above.

Having briefly described the operation of the primer or recycling valve, the operation of the relief mechanism for said valve is now described.

Referring to FIG. 2, the poppet valve is shown in its closed position, or that position for normal operating pressures. Should for any reason the liquid pressures in the discharge line 4 become excessive, the increased pressure is sensed in chamber 36 via tubing 30. The increased pressure within chamber 36 counteracts or opposes the spring force of spring 38 and forces piston 34 forward so that its stem engages piston 16 to open poppet valve 12. Piston areas and necessary spring forces are properly calculated and adjusted to accurately accomplish this function. Sufficient clearance between the stem portion of piston 34 and piston 16 is provided when poppet valve is closed to allow for the axial adjustment of cylinder 32 and for expansion and contraction of the parts due to the heating and cooling effects of various liquids in the system. Upon opening, part of the liquid is immediately recycled through ports 18 and back to the pump inlet, resulting in a pressure relief on the discharge line. Poppet valves 12 will remain open until the excessive pressure in the discharge line is relieved back to a preset normal level. With safe pressures sensed in chamber 36, spring 38 again forces piston 34 away from poppet valve 12 allowing same to again close. Should the pressure again increase, the process would be repeated.

Vent 39 prevents an increase in air pressure between piston 34 and web 35.

Cylinder 32 is threaded into housing 10 to provide adjustment for the relief pressure. Connector 31 is backed off slightly to enable turning of cylinder 32 and is retightened to lock cylinder 32 in position. Thus, by turning in piston 32, the compression of spring 38 is increased with a corresponding increase in the effective relief pressure. The opposite effect is gained by turning piston 32 in the opposite direction.

In summary, then, the present invention provides immediate pressure relief in a liquid pumping system by a novel relief apparatus that forms an integral part of the self-priming system yet remains distinct from or does not interfere with the normal function of the self-priming portions of the system. The apparatus includes a pressure chamber located within the primer valve housing and formed from an enclosed cylinder. The cylinder is opened at one end to a pressure sensing line attached to the discharge column, and opened at the other end to a piston. The piston is so arranged within the valve housing that it remains physically out of contact from the primer valve proper and its operating mechanism. However, in the event of excess pressure sensed in the pressure sensing line, an increase in pressure occurs in the pressure chamber to cause the piston to force the primer valve open and override the primer valve operating mechanism tending to counteract or hold the primer valve closed.

While the instant invention has been disclosed and illustrated with reference to a particular embodiment thereof, it is to be appreciated that variations and modifications thereof may be made without departing from the spirit and scope of the invention. One such variation could include a diaphragm means interposed on tubing 30 so that only air pressure, as opposed to fluid pressure, is communicated to chamber 36.

What is claimed is:

1. A liquid system comprising an elongated pipe having an opening defined in the wall thereof, a valve movable between positions opening and closing said opening, a housing mounted at one end on the outside of said pipe about said opening, a web dividing said housing into a pair of isolated compartments one adjacent said opening and one remote therefrom, ports defined by said adjacent compartment, a first piston connected to said valve received in said adjacent compartment between said ports and said web, first resilient means biasing said first piston to hold said valve in the open position, operating means to move said first piston to close said valve responsive to a predetermined flow condition within said pipe, said web having a guide opening, a second piston received in said remote compartment having a projection extending through said guide opening into said adjacent compartment and terminating spaced from said first piston, second resilient means biasing said second piston away from said web, a closure for the other end of said housing, and pressure relief means to move said second piston toward said web responsive to a predetermined pressure within said pipe whereupon said projection mechanically contacts said first piston and opens said valve overriding any effect of said operating means.

2. A liquid system as set forth in claim 1, wherein said closure is threaded to the other end of said housing to enable adjustment of said closure by rotating the same relative to said web.

3. A liquid system as set forth in claim 1, wherein said operating means includes a venturi formed within said pipe and a conduit communicating the throat of said venturi with the space defined between said first piston and said web.

4. A liquid system as set forth in claim 1, wherein said pressure relief means includes a conduit communicating the interior of said pipe with the space defined between said second piston and said closure, and a vent leading from the space defined between said second piston and said web.

References Cited

UNITED STATES PATENTS

| 2,902,940 | 9/1959 | Meyer | 137—117 XR |
| 1,969,366 | 8/1934 | Green | 251—24 |
| 2,922,431 | 1/1960 | Jensen | 137—117 |
| 3,311,124 | 3/1967 | Gates | 137—115 |
| 3,370,604 | 2/1968 | Napolitano | 137—117 |

WILLIAM F. O'DEA, *Primary Examiner.*

WILLIAM H. WRIGHT, *Assistant Examiner.*

U.S. Cl. X.R.

137—108, 115, 116, 484.4, 502